Nov. 23, 1954
F. W. BROOKS
2,695,078
BRAKE WEAR COMPENSATING DEVICE
Filed Jan. 10, 1951
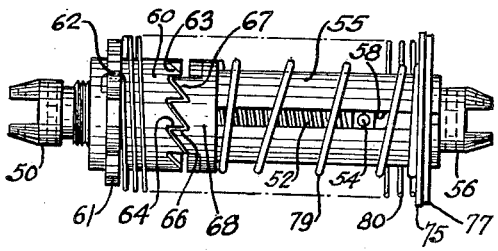
Fig. 1.
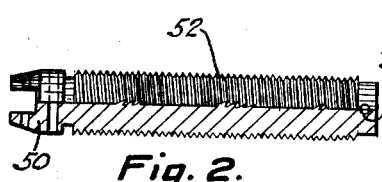
Fig. 2.
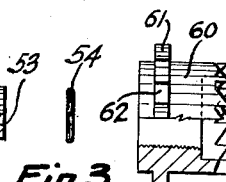
Fig. 3.
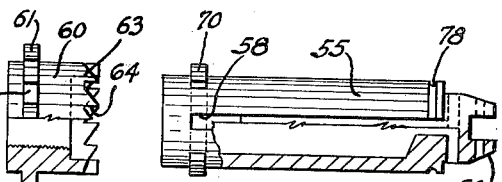
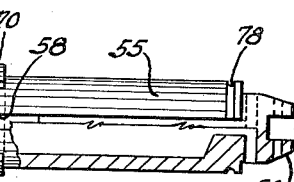
Fig. 4.   Fig. 5.
Fig. 6.
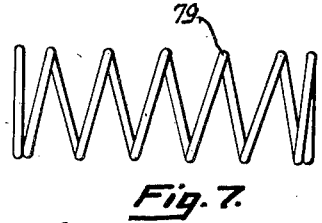
Fig. 7.
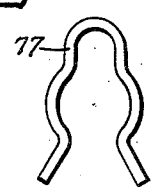
Fig. 8.   Fig. 9.   Fig. 10.
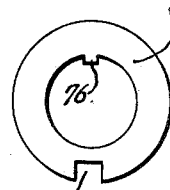
Fig. 11.
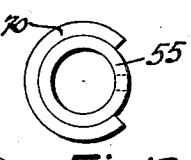
Fig. 13.
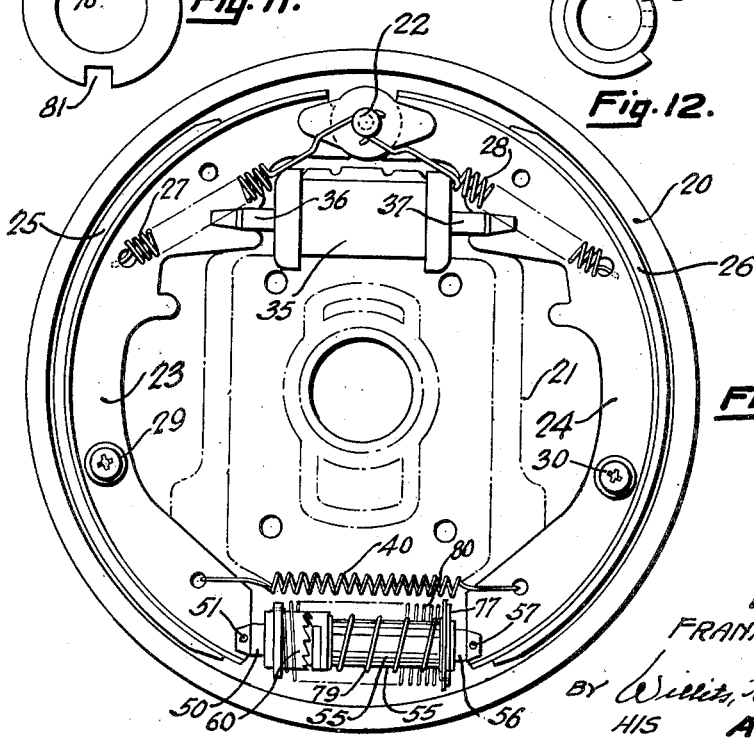
Fig. 14.
INVENTOR
FRANK W. BROOKS
BY *Willits, Hardman & Filer*
HIS ATTORNEYS

United States Patent Office 2,695,078
Patented Nov. 23, 1954

2,695,078

BRAKE WEAR COMPENSATING DEVICE

Frank W. Brooks, Dayton, Ohio, assignor to General Motors Corporation, Detroit, Mich., a corporation of Delaware Application January 10, 1951, Serial No. 205,401

8 Claims. (Cl. 188—79.5)

This invention relates to improvements in vehicle brakes.

It is among the objects of the present invention to provide an internally expanding vehicle brake with automatic means for adjusting the brake shoes relatively to the brake drum to compensate for the wear of the brake lining carried by the shoes.

Adjustment by the device of the present invention is made whenever the predetermined clearance between the brake shoe lining and the drum is exceeded due to wear of the lining, such increased clearance requiring the brake shoe applying means to be actuated through an increased range of movement and thereby render the adjusting means, or more particularly cooperating members thereof, operative to assume new relative positions in which the predetermined clearance between the brake shoe lining and the drum is reestablished.

Further objects and advantages of the present invention will be apparent from the following description, reference being had to the accompanying drawing wherein a preferred embodiment of the present invention is clearly shown.

In the drawing:

Fig. 1 is a view of the compensating device, one part thereof, the surrounding torsion spring, being broken away to disclose other structures.

Figs. 2 to 13 inclusive are views, some in partial section, illustrating detail parts of the device of which, Fig. 2 illustrates the threaded stud member of the device, said member being attachable to one brake shoe.

Fig. 3 the pin carried by the member shown in Fig. 2.

Fig. 4 the nut, threadedly mounted upon the member of Fig. 2 and provided with ratchet teeth.

Fig. 5 shows the second member of the device attached to the other brake shoe so as to be movable therewith.

Fig. 6 illustrates the collar carried by the member shown in Fig. 5 and provided with ratchet teeth cooperable with the teeth on the nut shown in Fig. 4.

Fig. 7 shows a pressure spring which surrounds the member shown in Fig. 5 and which yieldably maintains the collar of Fig. 6 in normal position on said members.

Fig. 8 is a view of an abutment washer secured on the member of Fig. 5.

Fig. 9 shows a spring clip to hold the washer of Fig. 8 upon the member of Fig. 5.

Fig. 10 illustrates the torsion spring surrounding the device and anchored to the collar of Fig. 8 and to the nut of Fig. 4.

Fig. 11 is a flat view of the collar of Fig. 8.

Fig. 13 is a perspective view of the collar shown in Fig. 6 and

Fig. 14 shows a vehicle brake at a reduced scale equipped with the present invention.

Figure 12:
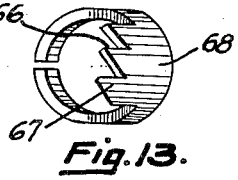
Fig. 12 is an end view taken from the left, of the member shown in Fig. 5.

The Fig. 14 of the drawing illustrates, at reduced scale, a vehicle brake equipped with the present invention. The numeral 20 designates the rotating brake drum. A backing plate 21, shown in dot dash lines, is immovably secured to any suitable part of the vehicle equipped with the brake. An abutment pin 22 is mounted upon the backing plate 21, this abutment pin 22 providing an anchor for two adjacent ends of brake shoes 23 and 24 within the drum 20. Brake shoe 23 is faced with a friction brake lining 25, a similar lining 26 being attached to the outer peripheral surface of the brake shoe 24. A spring 27 has its one end anchored to the anchor pin 22, the other end being attached to the brake shoe 23, constantly urging the one end of the brake shoe 23 into engagement with the anchor pin 22. A similar spring 28 has its one end connected to the anchor pin 22 the opposite end thereof being secured to the brake shoe 24, this spring 28 yieldably urging the one end of the brake shoe 24 into engagement with the anchor pin 22. Any suitable spring equipped attachment pin 29 movably holds the brake shoe 23 to the backing plate 21, a similar pin 30 holding the brake shoe 24 movably upon the backing plate 21.

The means for applying or moving the brake shoes into frictional braking engagement with the rotating drum 20 consists of an hydraulically actuated mechanism 35 from opposite ends of which there extend plungers 36 and 37, the plunger 36 engaging the brake shoe 23, the plunger 37 engaging the brake shoe 24. When hydraulic actuating medium is introduced under pressure into the device 35, plungers 36 and 37 will move outwardly in opposite directions and thus urge their respective brake shoes 23 and 24 outwardly.

The two adjacent ends of the brake shoes 23 and 24, opposite the ends engaging the abutment or anchor pin 22, have a spacer or abutment mechanism interposed therebetween. In this instance the spacer mechanism consists of the automatically adjustable compensating device of the present invention. A spring 40 has one end attached to the brake shoe 23 and its opposite end to brake shoe 24, this spring yieldably pulling the two adjacent ends of the brake shoes into constant engagement with the automatically adjustable compensating device. Spring 40 is comparatively weaker than the springs 27 and 28 at the diametrically opposite side of the brake, so that when the hydraulic power applying means or device 35 is activated to push the respective brake shoes 23 and 24 outwardly toward the rotating brake drum 20, springs 27 and 28 will overcome the effect of spring 40 to hold the ends of the brake shoes against movement and thus in response to the outward force exerted by the element 35 or more particularly its plungers 36 and 37, the ends of the shoes between which spring 40 is connected will at first move outwardly to cause engagement of the adjacent ends of the linings 25 and 26 with the rotating drum. Continued expansion force by the device 35 will move the brake shoes 23 and 24 outwardly until starting at their lower most ends the entire surface of brake shoe lining will be progressively brought into frictional engagement with the rotating drum.

The automatically adjustable compensating device is shown assembled in the Fig. 1. The Figs. 2 to 13 inclusive detailedly show the various elements of this device. The numeral 50 designates one member of the compensating device, this member having a forked end which receives the web portion of the brake shoe 23. An attachment pin 51, shown in Fig. 14, extends through aligned openings in the forked end of the element 50 and through the web portion of the brake 23 thereby anchoring the member 50 to said brake shoe 23 so that said member 50 will move with the brake shoe. This member 50 is in the form of a stud, the body portion of which has screw threads 52 in its outer peripheral surface for substantially its entire length. A transverse hole 53 is provided in the end of member 50 opposite its forked end, this end of the member being referred to hereinafter as its inner end. The other or second member of the compensating device is of tubular formation being designated by the numeral 55. Like member 50 it has a forked end 56 fitting over the web portion of brake shoe 24, a pin 57 extending through aligned holes in the member 56 and a hole in the webbing of the brake shoe 24 for anchoring this second member 55 to said brake shoe 24 so that this member moves in response to movement of this brake shoe. The tubular portion of the member 55 slidably receives the screw threaded portion of the first member 50 so that it may be said that members 50 and 55 telescopically engage each other. It is necessary for the operation of the compensating device to render members 50 and 55 relatively movable longitudinally but not rotatably. In order to do this a pin 54 is inserted in the opening 53 in member 50, one end of this pin extending into a longituidnal slot 58 provided in the tubular portion of member 55. Thus pin 54, anchored to the member 50 and extending into the longitudinal slot 58 of member 55, permits said members to move one relative to the other in a longitudinal direction but prevents said members to move rotatively one relatively to the other. Therefore as the end of the brake shoes 23 and 24, between which these two members are mounted, move to separate in response to activation of the hydraulic applying device 35 as has previously been described, members 50 and 55 will be moved coaxially apart the member 50 sliding within the tubular member 55.

An abutment nut 60 is threadedly mounted upon the member 50, said abutment nut having an annular, outwardly extending flange 61 in which a plurality of equally spaced notches 62 are provided. The inner annular end edge of this abutment nut 60 or more particularly the edge of the nut facing the member 55 has ratchet teeth 63 provided therein, each ratchet tooth having a sloping surface and a surface 64 which is substantially parallel to the axis of the nut. Rotation of the nut 60 in one direction upon the member 50, or more particularly its screw threaded portion 52, will move said nut longitudinally of said member 50 in a direction toward the member 55. When urged rotatively in this direction the flat surfaces 64 of the respective ratchet teeth of the nut will be urged into locking engagement with corresponding flat surfaces 66 of ratchet teeth 67 on the collar 68 which is slidably supported on the other or second member 55. The said second or other member 55 of the compensating device has an annular, outwardly extending flange 70 a portion of which is cut away as shown in Fig. 12. The collar 68 has a segmental portion of a width equal to the cut away portion of the annular flange 70 of member 55 so that when collar 68 is mounted upon the member 55 and is moved into abutting engagement with the flange 70 on said member, the segmental portion of the collar 68 fits into said cut away portion of the flange and thus said collar is secured to member 55 so as to be nonrotatable thereon. As the Figs. 6 and 13 clearly show collar 68 has ratchet teeth 67 in the outer end edge of the segmental extension, which cooperate with the ratchet teeth 63 on the nut to lock the nut normally against rotative movement relatively to the member 50 upon which it is carried. An abutment washer 75, provided with an inwardly extending tongue 76 to be received by the longitudinal groove or slot 58 in the member 55, is secured to said member by the spring clip 77 which is inserted in the annular groove 78 in member 55. A coil spring 79 fits about the member 55 and is interposed between the collar 68 and the abutment washer 75. This spring constantly yieldably urges the collar 68 so that its toothed segmental portion is held within the cutaway space in flange 70 as has been mentioned heretofore. This holds the collar 68 upon member 55 so that said collar cannot rotate on said member yet the ratchet teeth 67 thereon may cooperate with and be engaged by the ratchet teeth 63 on the adjustable spacing nut 60. A torsion spring 80 surrounds the compensating device, one end of the torsion spring being anchored in one of the notches 62 in the annular flange 61 of the nut, the other end of said torsion spring being anchored in a notch 81 provided in the abutment washer 75 which, as has been mentioned, is nonrotatably secured to the member 55. This torsion spring 80 is biased so that normally it exerts a turning effort on the nut or spacing means 60 in a direction which when permitted will move said nut longitudinally of the threaded portion 52 of member 50 in a direction toward the ratchet collar 68 on member 55. The locking engagement of the contacting surfaces 64 and 67 of the respective ratchet teeth is of a length substantially equal to the predetermined distance of normal movement of the brake shoes 23 and 24 frictionally to engage the rotating drum 20 for applying a braking effort thereupon.

As long as this required predetermined movement of the brake shoes 23 and 24 outwardly to effect frictional and braking engagement of their respective linings 25 and 26 with the rotating drum 20 remains at the predetermined length the resulting movement of the nut on member 50 relatively to the collar 68 on member 55 will not cause the engaging surfaces 64 and 66 of the cooperating nut and collar to become disengaged or free and thus the torsion spring 80 will not become effective to turn the nut on its supporting member 50. However, when the linings 25 and 26 or one of said linings wear so that a greater separating movement of the brake shoes is required to effect braking engagement of said linings with the rotating drum 20 then the predetermined separating movements of the members 50 and 55 due to such increased movements of the brake shoes outwardly will likewise be increased and thereby cause the ratchet teeth surfaces 64 of the nut to be disengaged from the cooperating ratchet teeth surfaces 66 on the collar 68 consequently permitting the torsion spring 80 to become effective to rotate the nut relatively to its nonrotatable supporting member 50. As the nut is so rotated by the torsion spring 80 the pitch of the threaded connection of the nut with the member 50 will move the nut longitudinally of said member toward the collar 68 and thus cause the ratchet teeth surfaces 64 of the nut again to abut the surfaces 66 of the ratchet teeth on collar 68. Thus the rotation of the nut by the torsion spring 80 is limited and under ordinary circumstances the nut will be rotated substantially through an arc equal to the spacing of one or two ratchet teeth depending upon the separation of the members 50 and 55 in response to brake application movements of the shoes 23 and 24.

If under any circumstances the tip ends of the respective ratchet teeth on the nut 60 or collar 68 should engage and jam, the pressure exerted against these tips by the reaction of the application of the brake shoes upon the rotating drum will cause no damage, for such pressure will cause the collar 68 to be moved longitudinally of the member 55 against the effect of the spring 79, thus eliminating crushing or damage of the ratchet teeth at their tips. Such abutment of the tips if occurring under any circumstances will be eliminated as soon as pressure is removed at which time the teeth will again assume their normally meshing or engaging positions.

From the aforegoing description it will be seen that the present invention provides a device automatically adjustable in response to the degree of separating movements of the brake shoes to apply braking efforts upon the rotating drum, no adjustment resulting as long as the range of separating movements of the brake shoes to apply braking effort remain within predetermined limits. However, if undue or excessive wear of either brake linings 25 or 26 results in said brake shoes, in order to apply proper braking effort, the compensating device is correspondingly moved to effect adjustments which will increase the over all length of the abutting compensating device between the two brake shoes and thereby compensate for the wear of the brake lining. In its adjusted position the adjustable compensating device again properly separates the adjacent ends of the brake shoes 23 and 24 between which said device is interposed so that only the predetermined range of travel of said brake shoes is required to apply the proper and necessary braking effort upon the rotating drum.

While the embodiment of the present invention as herein disclosed, constitutes a preferred form, it is to be understood that other forms might be adopted.

What is claimed is as follows:

1. A brake comprising a pair of brake shoes within a rotatable drum, anchoring and force applying means interposed between said shoes at two adjacent ends thereof, said anchoring means providing an immovable stop engaged by the ends of the shoes, the applying means being operative to move said shoes outwardly into frictional engagement with the drum, and a wear compensating abutment device interposed between the other two adjacent ends of said shoes, said abutment device consisting of two members, one axially supporting the other to permit relative longitudinal movement and connected respectively with the brake shoes to prevent rotative movement therebetween, the one member being secured at its one end to one of the brake shoes and including ratchet teeth disposed at its other end, the second member having screw threads on its exterior surface, its outer end being attached to the other brake shoe; a nut threadedly engaging said second member and having ratchet teeth normally engaging the ratchet teeth on the said one member, whereby rotation of the nut on said second member is prevented; and torsion means anchored to said one member and to the nut, said means being operative to rotate the nut on its supporting member and toward the ratchet teeth on the said one member, only when movements of the shoes to engage the drum are of sufficient extent to separate the engaging ratchet teeth, whereby the overall length of said members, when engaged, is increased.

2. A brake comprising a pair of brake shoes within a rotatable drum, anchoring and force applying means interposed between said shoes at two adjacent ends thereof, said anchoring means providing an immovable stop engaged by the ends of the shoes, the applying means being operative to move said shoes outwardly into frictional engagement with the drum, and a wear compensating abutment device interposed between the other two adjacent ends of said shoes, said abutment device consisting of two members, one telescopically supporting the other, each member being anchored to a respective brake shoe, the inner fitting member being exteriorly screw threaded; means connecting one member to the other to permit longitudinal relative movement therebetween and to prevent rotative relative movement; a nut threadedly engaging the screw threaded member so as to move longitudinally thereon when rotated; ratchet teeth on the inner end edge of said nut; means forming ratchet teeth positioned on the other member normally meshing with the ratchet teeth on the nut to prevent rotation of the nut; and a torsion spring having one end secured to said other member and the other end secured to the nut, said spring being biased to rotate the nut and cause it to move longitudinally on its supporting member toward the ratchet teeth of said other member, only when movement of the brake shoes to engage the drum is of sufficient extent to actuate said members and disengage the ratchet teeth.

3. A brake comprising a pair of brake shoes within a rotatable drum, anchoring and force applying means interposed between said shoes at two adjacent ends thereof, said anchoring means providing an immovable stop engaged by the ends of the shoes, the applying means being operative to move said shoes outwardly into frictional engagement with the drum, and a wear compensating abutment device interposed between the other two adjacent ends of said shoes, said abutment device consisting of two members, one a tubular member, the second a screw threaded stud slidably extending into said one member, each member having its outer end anchored to a respective brake shoe; a longitudinal slot in said one member and a transverse pin in said screw threaded member, the pin extending into the slot thereby permitting said members to move relatively longitudinally but preventing relative rotation thereof; a nut on said screw threaded member, said nut having ratchet teeth provided in its end edge facing the tubular member; means non-rotatably mounted upon said tubular member and providing ratchet teeth normally engaged by the ratchet teeth on the nut to prevent rotation of said nut on said screw threaded member; and a torsion spring encompassing the device, one end of the spring being secured to the tubular member, the other end to the nut, said spring being biased to rotate the nut on said screw threaded member to move it longitudinally thereon toward the ratchet teeth on the tubular member only when movement of the brake shoes to engage the drum exceeds the range of movement of said members necessary to separate the normally engaging ratchet teeth.

4. A brake comprising a pair of brake shoes within a rotatable drum, anchoring and force applying means interposed between said shoes at two adjacent ends thereof, said anchoring means providing an immovable stop engaged by the ends of the shoes, the applying means being operative to move said shoes outwardly into frictional engagement with the drum, and a wear compensating abutment device interposed between the other two adjacent ends of said shoes, said abutment device consisting of two telescopically engaging members, the inner fitting one having screw threads, each member being anchored to a respective brake shoe; means interposed between said members for preventing relative rotation but permitting them to move relatively longitudinally; a nut threadedly mounted on the screw threaded member, said nut having a cylindrical portion in the end of which ratchet teeth are provided, each tooth having a camming surface and a locking surface parallel with the axis of the telescopically engaging members and greater in height than the range of relative longitudinal movement of the two telescopically engaging members in response to movement of the two brake shoes into braking engagement with the drum; similar cooperating ratchet teeth carried on the member into which the screw threaded member extends, the ratchet teeth of both members normally engaging; and a torsion spring about said members, the ends of the spring being secured to the one member and to the nut, said spring exerting a turning effort upon said nut which is effective only when the separating movement of the said members by the movement of the brake shoes into drum engagement exceeds the height of the locking surfaces of the ratchet teeth, whereby the nut is rotated on its threaded member and moved longitudinally thereon to increase the overall length of said members when the cooperating ratchets are normally engaged.

5. A blade comprising a pair of brake shoes within a rotatable drum, anchoring and force applying means interposed between said shoes at two adjacent ends thereof, said anchoring means providing an immovable stop engaged by the ends of the shoes, the applying means being operative to move said shoes outwardly into frictional engagement with the drum, and a wear compensating abutment device interposed between the other two adjacent ends of said shoes, said abutment device consisting of two telescopingly engaging members, each secured non-rotatively to a respective brake shoe and movable longitudinally relatively to each other in response to brake shoe operation by the applying means; a nut threadedly supported by one of said members and having ratchet means cooperably connected with the other member when the brake shoes are disengaged from the drum or while said shoes move through a predetermined distance to engage and exert braking effort upon the drum; and torsion means exerting a constant turning effort upon the nut, which is rotated by said torsion means only when the movement of the brake shoes and the members connected thereto exceeds said predetermined distance to apply braking effort, whereby the ratchet means on the nut is disengaged from the other member and consequent rotation of the nut on its supporting member and toward said other member adjusts the device to compensate for the movement of the shoes exceeding said predetermined distance.

6. A brake comprising a pair of brake shoes within a rotatable drum, anchoring and force applying means interposed between said shoes at two adjacent ends thereof, said anchoring means providing an immovable stop engaged by the ends of the shoes, the applying means being operative to move said shoes outwardly into frictional engagement with the drum, and a wear compensating abutment device interposed between the other two adjacent ends of said shoes, said abutment device consisting of two members, each one attached to a respective brake shoe, one member having a tubular portion, the other an exteriorly threaded portion slidably extending into the tubular portion of said one member; means carried by the threaded member and engaging the tubular member for permitting relative longitudinal movement and preventing relative rotative movement between said members; a non-rotatable collar yieldably urged by a resilient member against a stop provided at the inner end of the tubular member, said collar having ratchet teeth; a nut threadedly mounted upon the threaded member and having ratchet teeth engageable with the ratchet teeth on the said collar for preventing rotation of the nut; and a torsion spring connected between the tubular member and the nut, said spring being biased to exert a turning effort upon said nut, effective only to rotate the nut and cause it to move longitudinally on its suporting member away from its brake shoe attachment and toward said non-rotatable collar when the drum engaging movement of the shoes exceeds a predetermined limit to cause movement of the two members to disengage the ratchet teeth.

7. In combination with a brake having a pair of brake shoes within a rotatable drum and force anchoring and applying means interposed between said shoes at two adjacent ends thereof, said anchoring means providing an immovable stop engaged by the ends of the shoes, the applying means being operative to move said shoes outwardly into frictional engagement with the drum, of a wear compensating abutment device interposed between and secured to the other two adjacent ends of said shoes, said device consisting of two members each secured to a respective brake shoe so as to move therewith, one member slidably fitting into the other member and being provided with screw threads on the portion fitting into said other member, the one member having a nut upon its screw threaded portion engageable with an abutment collar on said other member; cooperating ratchet teeth on the contiguous surfaces of the nut and collar which prevent rotation of the nut on said other member while the ratchet teeth are engaged, and a torsion spring anchored to said other member and to the nut, said spring being biased to rotate the nut on said one member toward the said other member in response to movement of the brake shoes into braking engagement with the drum which exceeds the length of the contacting surfaces of the cooperating ratchet teeth.

8. In combination with a brake having a pair of brake shoes within a rotatable drum and anchoring and force applying means interposed between said shoes at two adjacent ends thereof, said anchoring means providing an immovable stop engaged by the ends of the shoes, the applying means being operative to move said shoes outwardly into frictional engagement with the drum, of a wear compensating abutment device interposed and secured between the other two adjacent ends of said shoes, said device consisting of two telescopically engaging members each secured non-rotatively to a respective brake shoe so as to move therewith, shoe spacing means adjustably supported on one member and engaging the other member, adjustment of said spacing means on its supporting member varying the distance between the points of attachment of the two members with their respective shoes, normally engaging, releasable ratchet means on the spacing means and said other member preventing adjustment of said spacing means while the two members are telescopically moved a predetermined outward distance by the movement of the shoes into braking engagement with the drum, said ratchet means being disengaged and released to permit adjustment of said spacing means on its supporting member and toward the other member in response to telescopic outward movement of both members by the brake shoes for a distance in excess of said predetermined distance, and resilient means attached to the spacing means and constantly exerting a force upon said spacing means to effect adjustment thereof.

References Cited in the file of this patent

UNITED STATES PATENTS

| Number | Name | Date |
|---|---|---|
| 1,395,738 | Schechter | Nov. 1, 1921 |
| 2,152,041 | Goepfrich | Mar. 28, 1939 |
| 2,196,799 | Keplinger | Apr. 9, 1940 |